United States Patent

Bauer et al.

Patent Number: 5,339,933
Date of Patent: Aug. 23, 1994

[54] LENGTH-ADJUSTABLE CRASH DAMPER FOR VEHICLES

[75] Inventors: Hans J. Bauer, Altdorf; Wolfgang Würl, Heilsbronn; Ludwig Haas, Altdorf; Otmar Hein, Winkelhaid, all of Fed. Rep. of Germany

[73] Assignee: Suspa Compart AG, Altdorf, Fed. Rep. of Germany

[21] Appl. No.: 8,570

[22] Filed: Jan. 22, 1993

[30] Foreign Application Priority Data

Jan. 25, 1992 [DE] Fed. Rep. of Germany ....... 4202046

[51] Int. Cl.[5] .......................... F16F 9/32; B60R 19/26
[52] U.S. Cl. .................... 188/371; 267/139; 293/119; 403/362; 403/383
[58] Field of Search ............. 188/371, 374, 375; 267/134, 139, 140; 293/119, 132, 133, 136; 403/362, 379, 348, 349, 383

[56] References Cited

U.S. PATENT DOCUMENTS

| | | | |
|---|---|---|---|
| 1,241,189 | 9/1917 | Boone | 403/383 |
| 1,954,049 | 4/1934 | Jeffrey | 403/383 |
| 2,293,882 | 8/1942 | Batchelder | 403/362 |
| 3,053,526 | 9/1962 | Kendall | 267/134 |
| 3,145,018 | 8/1964 | Goodwiller | 403/362 |
| 3,428,150 | 2/1989 | Muspratt | 188/375 |
| 4,668,119 | 5/1987 | Galletti | 403/349 |
| 4,770,453 | 9/1988 | Reynolds | 293/119 |
| 5,181,589 | 1/1993 | Siegner et al. | 188/374 |

FOREIGN PATENT DOCUMENTS

| | | |
|---|---|---|
| 2149759 | 5/1983 | Fed. Rep. of Germany . |
| 3419165 | 11/1988 | Fed. Rep. of Germany . |
| 845622 | 8/1939 | France ..................... 403/348 |

*Primary Examiner*—Matthew C. Graham
*Attorney, Agent, or Firm*—Browdy and Neimark

[57] ABSTRACT

A crash damper for vehicles comprises two securing elements, by way of which it can be secured to the bumper on the one hand and to the body of the vehicle on the other hand. In order to be able to compensate manufacturing tolerances of the body of the vehicle, an adjustment device is provided for adjusting the distance between the securing elements.

15 Claims, 3 Drawing Sheets

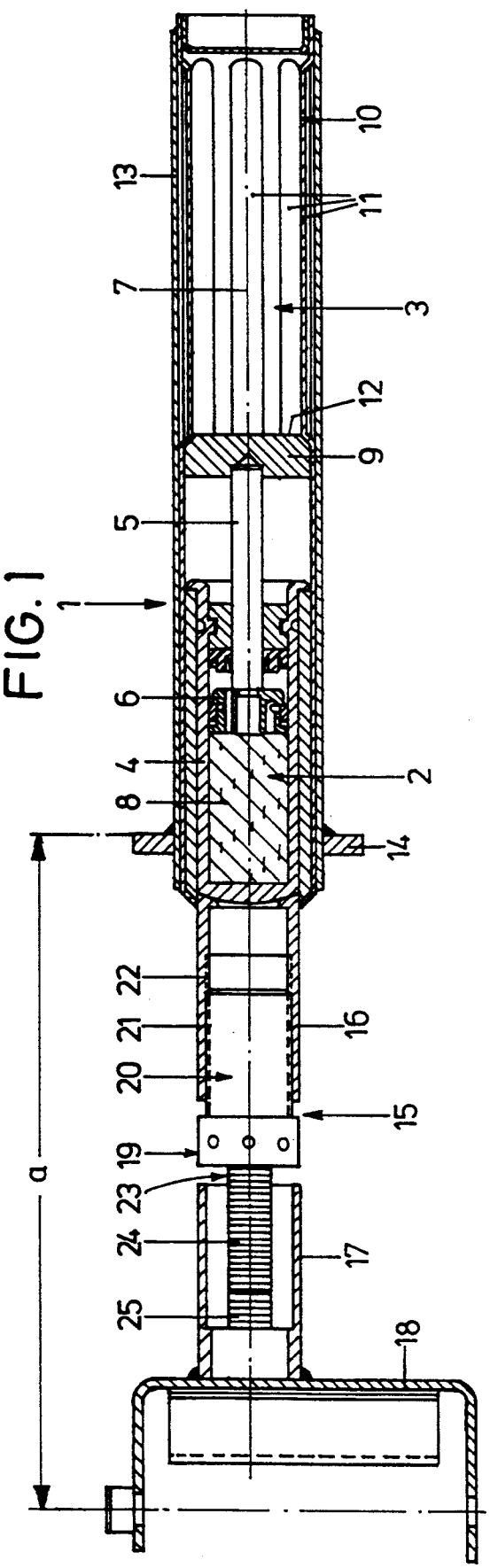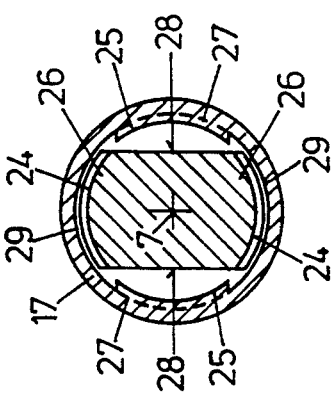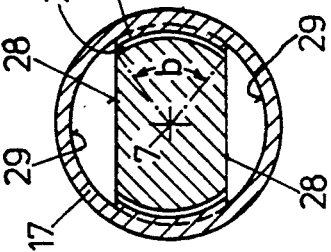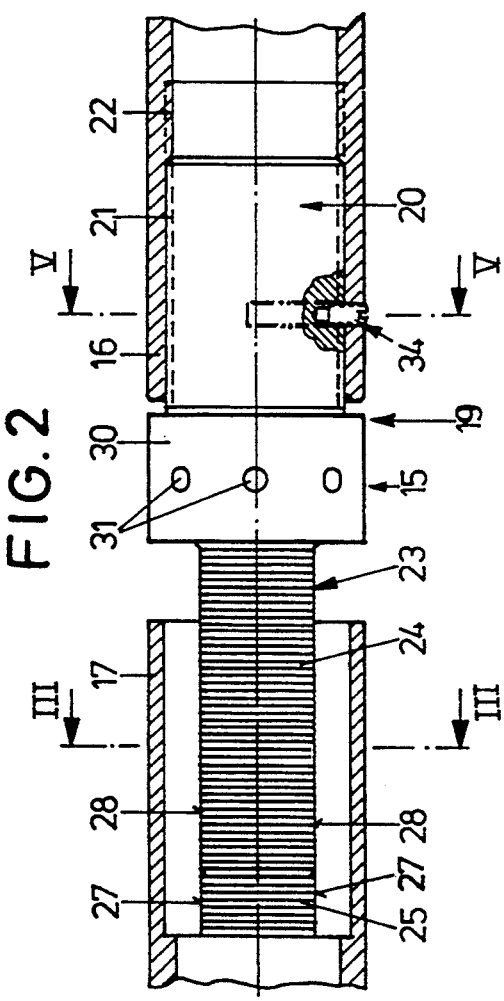

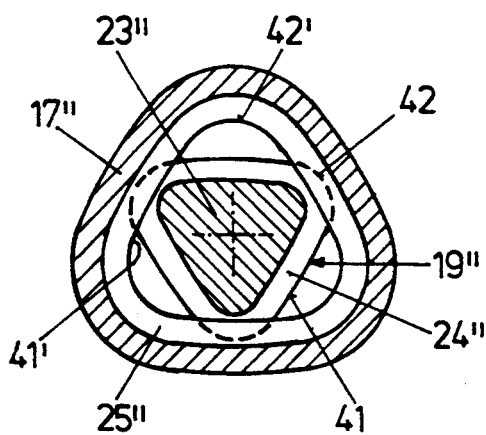
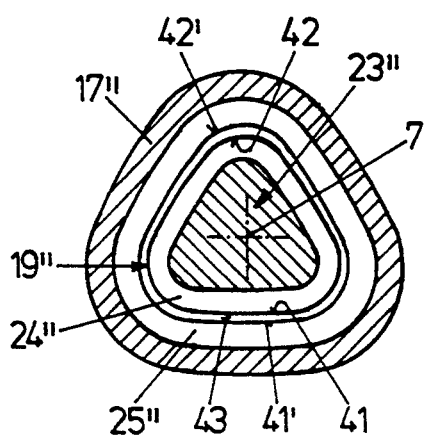
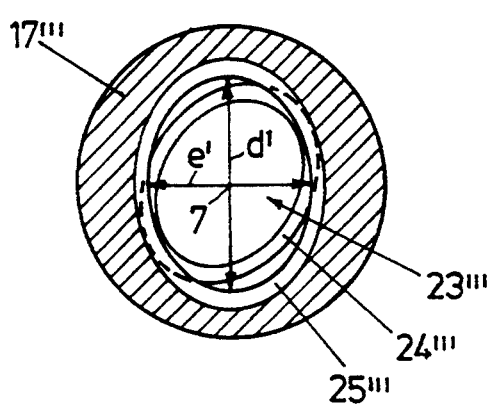
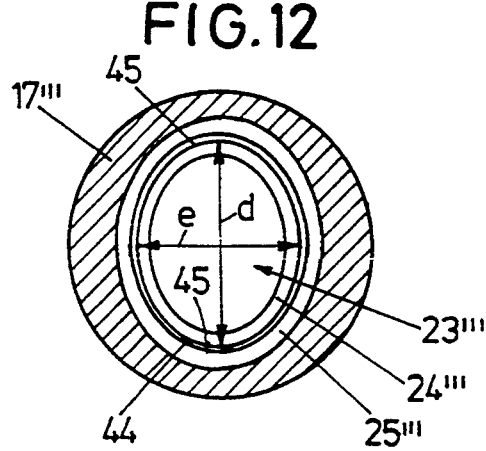
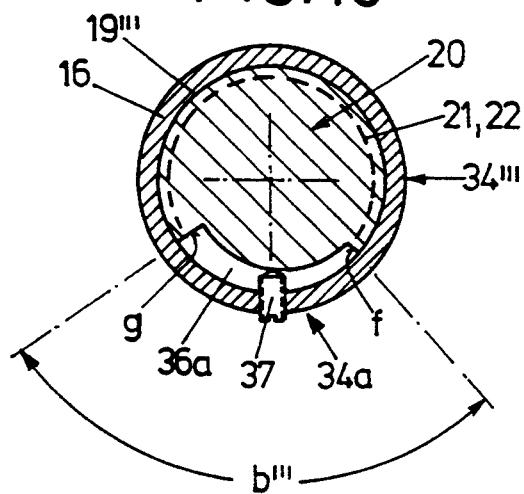
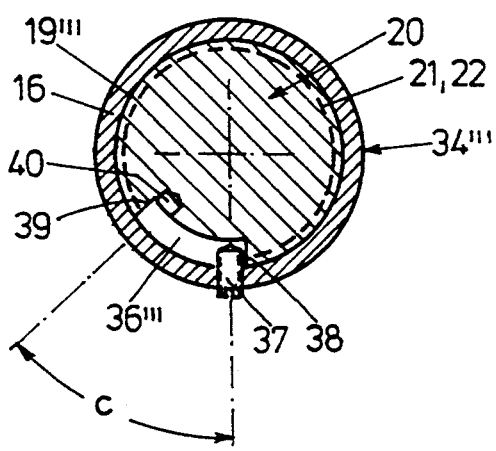

LENGTH-ADJUSTABLE CRASH DAMPER FOR VEHICLES

FIELD OF THE INVENTION

The invention relates to a crash damper for vehicles comprising at least one damper of an impact damper and a deformation damper for taking up crash energy, a first securing element connected with said at least one damper and securable to a vehicle and a second securing element connected with said at least one damper and securable to a bumper of the vehicle.

BACKGROUND OF THE INVENTION

Crash dampers of this type are known in numerous embodiments. A crash damper known for example from DE 21 49 759 C3 (corresponding to U.S. patent application Ser. No. 113,516 of Feb. 8, 1971) is formed in principle like a conventional hydraulic damper, whereby as a damping medium no fluid, but a compressible solid is used, as it is known for example from U.S. Pat. 3,053,526.

In another crash damper known from DE 34 19 165 C2 on the one hand a gas spring and on the other hand a hydraulic damper are provided, whereby the piston rod is provided with a predetermined buckling point.

From U.S. patent application Ser. No. 07/755,902 filed on Sep. 6, 1991 a crash damper is known, in which a reversible impact damper and an irreversible deformation damper are connected in line.

All crash dampers of the above-mentioned type are disposed between the front bumper or the front bumper bar and the body of a vehicle, in order to reversibly or irreversibly dampen the crash energy occurring in case of a frontal collision of the vehicle at least at lower speeds. When assembling the crash damper, manufacturing tolerances in the crude body must be compensated, which may be in the magnitude of 10 min. These tolerances are compensated during assembly by the use of washers, which causes a considerable time consumption for assembly.

SUMMARY OF THE INVENTION

It is an object of the invention to embody a crash damper for vehicles in such a manner that a compensation for manufacturing tolerances of the body is possible in a simple manner.

With a crash damper of the genetic type this object is attained according to the invention by the fact that between the at least one damper and one of the first and second securing element an adjustment device for adjusting the distance between the first and the second securing element is provided. Consequently, according to the invention an adjustment device is integrated in the crash damper, which ensures simple individual adjustment of the distance between the securing elements, by means of which the mentioned manufacturing tolerances can be compensated.

The adjustment device can be an adjustment spindle with two opposite threads; it is advantageous, however, when the adjustment device comprises an adjustment bolt, which has a central longitudinal axis and which is supported on one of the first and second securing element in the direction of the central longitudinal axis and is rotatable about the central longitudinal axis, and which bolt is lockable and releasable in relation to one of the first and second securing element in the direction of the central longitudinal axis by twisting about the central longitudinal axis and is displaceable in the direction of central longitudinal axis in a released state. With this embodiment adjustment is possible in a still shorter time, as a free axial displacement of the securing elements against each other is possible and as by a relatively short partial twisting a locking is attained in that position, in which the bumper has the right position in relation to the body of the vehicle. In this case the adjustment of the distance is preferably gradually.

Further features, advantages and details of the invention will become apparent from the ensuing description of example of embodiments taken in conjunction with the drawing.

BRIEF DESCRIPTION OF THE DRAWING

FIG. 1 shows a crash damper in a longitudinal cut,

FIG. 2 shows a partial longitudinal cut through an adjustment device of the crash damper according to FIG. 1 in an enlarged scale compared with FIG. 1, FIG. 3 shows a cross-section through the adjustment device according to line III—III in FIG. 2 in the unlocked state of the adjustment device, FIG. 4 shows a cross-section through the adjustment device according to line III—III in FIG. 2 in the locked state of the adjustment device, FIG. 10 shows a cross-section through a third example of embodiment of an adjustment device in an illustration according to FIG. 3, FIG. 11 shows a cross-section through the third example of embodiment of an adjustment device in an illustration according to FIG. 4, FIG. 12 shows a cross-section through a fourth example of embodiment of an adjustment device in an illustration according to FIG. 3, FIG. 13 shows a cross-section through the fourth example of embodiment of an adjustment device in an illustration according to FIG. 4, FIG. 14 shows a cross-section through a further embodiment of the adjustment device in an illustration according to FIG. 5 and FIG. 15 shows a cross-section through a modified form of embodiment of a twist limiter.

DESCRIPTION OF THE PREFERRED EMBODIMENTS

Figure 5:
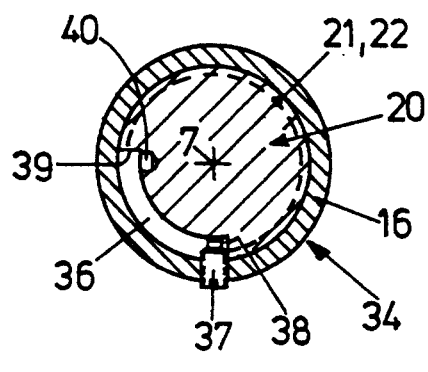
FIG. 5 shows a cross-section through the adjustment device according to line IV in FIG. 2 in the non-locked state of the adjustment device.

The crash damper 1 shown in the drawing, in particular in FIG. 1, consists of a reversible impact damper 2 and of an irreversible deformation damper 3. The impact damper 2 comprises a housing 4, in which a damping piston 6 secured to a piston rod 5 is arranged for displacement in the longitudinal direction of the central longitudinal axis 7. The housing 4 is filled with a compressible solid 8, which is known for example from U.S. Pat. 3,053,526 and which is commercially available for example under the trademark "Silastic" of Dow-Corning Cooperation, U.S.A.

The deformation damper 3 comprises an abutment plate formed as a deformation piston 9, on which the free end of the piston rod 5 supports. The deformation piston 9 supports on collar-shaped crimps 11, which extend in the longitudinal direction, i.e. parallel to the axis 7, which are formed in the wall of a slide tube 10, and which project inward towards the axis 7, to be more precise it supports on their ends 12 which face the housing 4. The slide tube 10 is connected with the housing 4 in a non-displaceable manner in the direction of the axis 7 and in turn is accommodated in a suspension tube 13, which is connected with the latter axially non-displaceably, for example by welding. At the suspension tube 13 in turn a flange-like securing element 14 is disposed, by means of which the suspension tube 13 and thus the entire crash damper 1 is secured for instance to the frame of a vehicle. Design and function of this crash damper is described in detail in U.S. patent application Ser. No. 07/755,902, to which reference is made.

At the housing 4 of the reversible impact damper 2 an adjustment device 15 is disposed. This adjustment device 15 comprises two robe sections 16, 17, the one tube section 16 of which is secured to the housing 4, while to the other tube section 17 a securing element 18 is secured, for example by welding in place. To this securing element 18 a front bumper bar of a vehicle is secured. The tube sections 16, 17 are arranged coaxially with each other and with the axis 7. The securing elements 14, 18 have a distance a from each other.

In the two tube sections 16, 17 an adjustment bolt 19 is arranged, which extends coaxially with the axis 7 and which releasably connects the two tube sections 16, 17 with each other. It is arranged in a twistable manner in a tube section 16, whereby it is supported axially non-displaceably in both directions of the axis 7 in case of non-twisting. This is realized in the present case by the fact that an external thread 21 is disposed on a support section 20, located in the robe section 16, of the adjustment bolt 19, which external thread 21 engages with a corresponding internal thread 22 in the tube section 16.

The adjustment bolt 19 comprises a coupling section 23, which is arranged in the tube section 17 at least to a considerable extend. This coupling section 23 comprises an external toothing 24, to which is associated a complementary internal toothing 25 in the robe section 17.

In the example of embodiment according to FIGS. 2 to 6 the external toothing 24 is formed on cylinder section surfaces 26 located diametrically opposite each other, which extend over a circumferential angle b of a little less than 90° of the circumference. The internal toothings 25 are formed accordingly over cylinder section surfaces 27 at the inner wall of the tube section 17, which are also located diametrically opposite each other and which also extend over a little less than 90° of the circumference. Between the cylinder section surfaces 26 flattenings 28 are formed, which are big enough not to collide with the internal toothings 25. Accordingly between the cylinder section surfaces 27 with the internal toothing 25 cut-outs 29 are formed, which are big enough so as to accommodate the external toothing 24 in collision-free manner. As can be seen from FIGS. 3 and 4 the coupling section 23 of the adjustment bolt 19 can be pushed into the tube section 17, the external toothing 24 being located in the cut-outs 29, while the internal toothing 25 engages with the area of the flattenings 28. As a consequence, the coupling section 23 can be pushed in any axial relative position into the tube section 17, by means of which the distance a of the securing elelments 14, 18 to each other is determined. By twisting the adjustment bolt 19 by 90° the external toothing 24 engages with the internal toothing 25, so that the coupling section 23 of the adjustment bolt 19 comes to a coupling connection with the tube section 17, which coupling connection is rigid in the direction of the axis 7. For reason that such a twisting about the axis 7 can take place in simple and quick manner, a twisting section 30 located between the tube sections 16, 17 is formed between the support section 20 and the coupling section 23, which twisting section 30 comprises a plurality of holes for engagement 31 distributed over its circumference, into which holes engagement is possible with a suitable tool. The external toothing 24 and the internal toothing 25 can be formed by normal threads, as is shown in FIG. 7. In this case the threaded heads 32 of the threaded webs 33 are usually flattened.

In case the threaded webs 33 on the one hand and the threads 21, 22 on the other hand have the same pitch s and the same pitch direction, then the distance a of the securing elements 14, 18 does not change, if the adjustment bolt 19 is twisted by 90° or producing or releasing the described connection. Due to manufacturing requirements it may be expedient to embody the external toothing 24 and the internal toothing 25 with the cross-section shown in FIG. 7, i.e. like a thread, however, not to provide it with a pitch. In this case, when twisting the adjustment bolt 19 for producing the described connection, the distance a between the securing elements 14 und 18 changes corresponding to the pitch of the threads 21, 22. As these threads 21, 22 are conventionally formed as fine-pitch threads, this change of the distance a can be tolerated.

Between the tube section 16 and the support section 20 another twist limiter 34 is arranged, which simultaneously contains a coupling securing means 35. For this purpose a partial circumferential groove 36 is cut into the support section 20, which groove extends over a circumferential section c corresponding to the circumferential angle b, that is in this case approximately 90°. In the tube section 16 a stop pin in the form of a stud screw 37 is disposed, which is screwed into the tube section 16 in the area of the support section 20 as far as being engaged with the partial circumferential groove 36. If the stud screw 37 in the position shown in FIG. 5 bears on the contact surface 38 of the groove 36, then the coupling section 23 is located in a position, in which it can be introduced into the tube section 17. When producing the locking between the coupling section 23 and the tube section 17 by twisting the twisting section 30 the stud screw 37 comes to rest on the contact surface 39, which is opposite to the contact surface 38, of the groove 36.

In this position the external toothing 24 completely engages with the internal toothing 25; consequently, between the coupling section 23 and the tube section 17 the maximum possible locking is produced. In order to secure the latter, the stud screw 37 is screwed into a corresponding safety bore 40 in the support section 20, i.e. at the root of the groove 36, by means of which inadvertent twistings are excluded. This means that the stud screw 37 together with the safety bore 40 forms the mentioned coupling securing means 35.

Figure 6:
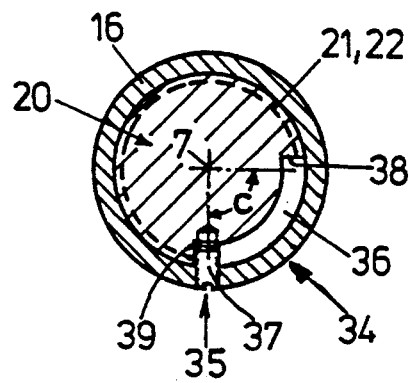
FIG. 6 shows a cross-section through the adjustment device according to line IV—IV in FIG. 2 in the locked stated of the adjustment device.
Figure 7:
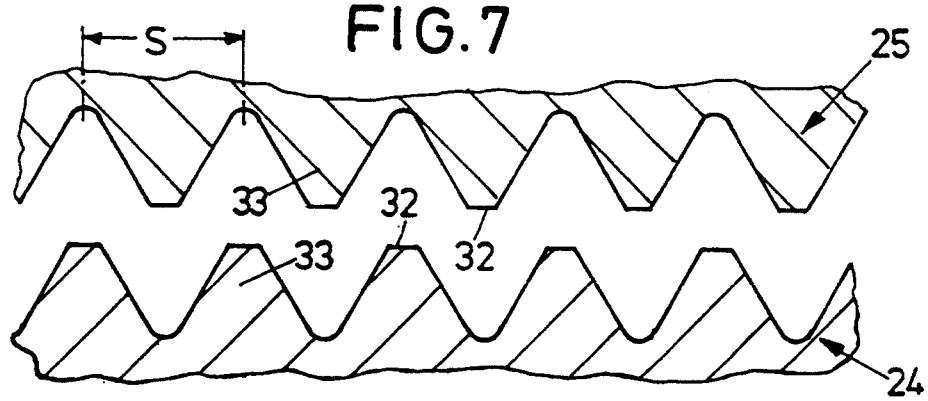
FIG. 7 shows the external toothing and the internal toothing of the adjustment device illustrated drawn apart.
Figure 8:
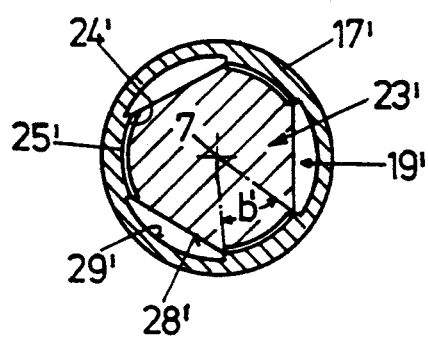
FIG. 8 shows a cross-section through a second example of embodiment of an adjustment device in an illustration according to FIG. 4.
Figure 9:
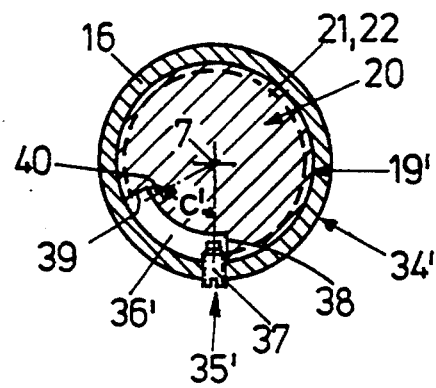
FIG. 9 shows a cross-section through the second example of embodiment of an adjustment device in an illustration according to FIG. 5.

In lieu of a 90° partition, as it was described for the example of embodiment according to FIGS. 2 to 7, also a 60° partition can be provided, as it is outlined in FIGS. 8 and 9. In this case the external toothings 24' and the internal toothings 25' each extend over a circumferential angle b' of approximately 60°. The same is true for the flattenings 28' and the cut-outs 29' and the partial circumferential groove 36'. Consequently, for the purpose of producing or releasing a coupling connection only a twisting of the adjustment bolt 19' by an angle c'=60° is necessary. As, apart from that, the example of embodiments coincide, in FIGS. 8 and 9 components comparable with FIGS. 3 to 6 are marked with the introduced reference numerals—with a double prime, respectively—so that a new description is not necessary.

As can be seen on the one hand from FIGS. 10 and 11 and on the other hand from FIGS. 12 to 14, a particularly rigid locking can be attained, if the external toothing 24" or 24'" on the one hand and the internal toothing 25" or 25'" on the other hand have a non-circular cross-section, so that when being twisted into the locked position they are distorted against each other also radially to the axis 7. By means of this a connection between the tube section 17" or 17'" and the respective coupling section 23" or 23'" is achieved, which connection is absolutely free from play in the direction of the central longitudinal axis 7.

In the example of embodiment according to FIG. 10 and 11 the external toothing 24" of the coupling section 23" and accordingly the internal toothing 25" of the tube section 17" have a cross-section, which corresponds approximately to an equilateral triangle, the sides 41 or 41' of which are slightly convexed and the edges 42 or 42' of which are extremely rounded. As can be seen from FIGS. 10 and 11, the coupling section 23" can be pushed into the tube section 17", if the edges 42' are adjacent to the edges 42, respectively, and if the sides 41' are adjacent to the sides 41. In this case there is little play 43 between the sides 41 and 41', which permits pushing one into the other. If, however, the adjustment bolt 19" is twisted by 60°, the external toothings 24" engage in the area of their edges 42 with the sides 41' of the internal toothings 25", as can be seen from FIGS. 10 and 11. The embodiment of the twist limiter 34 and in particular the embodiment of the partial circumferential groove 36' identically corresponds in this case to that according to FIG. 9, so that a new illustration and description is not necessary. In the locked position shown in FIG. 11, the threaded webs 33 (see FIG. 7) of the external toothing 24" and the internal toothing 25" engage with each other rigidly and free from play, as a distorsion radial to the axis 7 was performed.

In the example of embodiment according to FIGS. 12 to 14 the coupling section 23'" with the external toothing 24'" on the one hand and the internal toothing 25'" of the tube section 17'" each have an elliptical cross-section. The external toothing 24'" has a large axis d and a small axis e. Accordingly, the internal toothing 25'" has a large axis d' and a small axis e'. If the large axes d and d' and the small axes e and e' coincide, then—as can be seen from FIG. 12—the coupling section 23'" can be pushed into the tube section 17'", whereby there is small play 44 between the external toothing 24'" and the internal toothing 25'".

If the adjustment bolt 19'" is twisted by approximately 45°, the internal toothing 25'" engages free from play with the external toothing 24'", whereby also a distorsion radial to the central longitudinal axis 7 is performed. Locking takes place in this case—as can be seen from FIG. 13—only in the area of the crowns 45, associated to the large axis d or d', of the external toothing 24'".

As can be seen from FIG. 14, in this example of embodiment the partial circumferential groove 36'" extends only over a circumferential angle c'" approximately 45°; apart from that it is embodied in same manner as in FIGS. 5, 6 and 9, so that the same reference numerals as there can be used and reference can be made to the corresponding description.

In the example of embodiment according to FIGS. 10 and 11 on the one hand and in the example of embodiment according to FIGS. 12 to 14 on the other hand, where the twisting angle for producing or releasing the connection is fixed only approximately, it may be expedient to provide a twist limiter 34a, the partial circumferential groove 36a of which has an increasing depth. The depth f is smallest where the stud screw 37 serving as a stop pin is in the open state of the connection. In contrast, the depth is largest in that area, in which the stud screw 37 is in the locked state. As the increase of the depth from f to g is continuously, also in every intermediate position of the lockings of the external toothing 24" or 24'" on the one hand and the internal toothing 25" or 25'" on the other hand it is assured, that the adjusted position can be maintained, since with a stud screw 37 driven home a twisting in the direction towards the smallest depth f is exluded.

What is claimed is:

1. A crash damper for vehicles, comprising
at least one damper of an impact damper (2) and a deformation damper (3) for taking up crash energy;
a first securing element (14) connected with said at least one damper and securable to a vehicle;
a second securing element (18) connected with said at least one damper and securable to a bumper of said vehicle,
wherein an adjustment device 15 for adjusting a distance (a) between said first and second securing element (14, 18) is secured between said at least one damper (2, 3) and one of said first and second securing element (18),
wherein said adjustment device (15) comprises an adjustment bolt (19, 19', 19", 19'") having a central longitudinal axis (7), said bolt being rotatable between a first position and a second position on one of said first securing element and second securing element around said central longitudinal axis while said first securing element and said second securing element remain stationary,
wherein when in said first position said bolt is fixed in relation to said first securing element and said second securing element in the direction of said central longitudinal axis, and
when in said second position said bolt is released in relation to one of said first securing element and said second securing element in the direction of said central longitudinal axis to permit displacement of said bolt in relation to said one of said first securing element and said second securing element in the direction of said central longitudinal axis between a plurality of axial positions before being rotated back to said first position.

2. A crash damper according to claim 1, wherein the adjustment device (15) is formed to perform a gradual adjustment of said distance (a) of said first and said second securing element (14,18).

3. A crash damper according to claim 1, wherein the adjustment device (15) comprises a tube section (17,17′,17″,17‴) provided with an internal toothing (25,25′,25″,25‴), in which tube section a coupling section (23,23′,23″,23‴), provided with an external toothing (24,24′,24″,24‴), of the adjustment bolt (19,19′,19″,19‴) is arranged, whereby the external toothing (24,24′,24″,24‴) and the internal toothing (25,25′,25″,25‴) are engageable or disengageable by twisting of the adjustment bolt (19,19′,19″,19‴) for coupling and for decoupling respectively said tube section and said adjustment bolt.

4. A crash damper according to claim 3, wherein said internal toothing (25,25′) and said external toothing (24,24′) each extend over cylinder section surfaces (27,26) corresponding to each other, between which cut-outs (29), which have approximately the same circumferential angle (b), are formed for the purpose of taking up the internal toothing (25) or the external toothing (24) during the adjustment of the distance (a) of said first and said second securing element (14,18).

5. A crash damper according to claim 4, wherein the internal toothing (25″,25‴) and the external toothing (24″,24‴) have a non-circular, similar cross-section, whereby in a coincident position they are displaceable against each other in the direction of said central longitudinal axis (7).

6. A crash damper according to claim 3, wherein the internal toothing (25″) and the external toothing (24″) each have a cross-section approximately of an equilateral triangle with slightly convexed sides (41, 41′) and extremely rounded edges (42, 42′).

7. A crash damper according to claim 5, wherein the internal toothing (25‴) and the external toothing (24‴) each have an elliptical cross-section.

8. A crash damper according to claim 5, wherein the internal toothing (25″,25‴) and the external toothing (24″,24‴) in an engagement position are distorted against each other radially to said central longitudinal axis (7).

9. A crash damper according to claim 3, wherein the external toothing (24,24′,24″,24‴) and the internal toothing (25,25′,25″,25‴) are formed to be thread-like, respectively.

10. A crash damper according to claim 3, Wherein a twist limiter (34) is provided for limiting rotation of the adjustment bolt (19,19′,19″,19‴) about said central longitudinal axis (7) to a given circumferential angle (b,b′,b″).

11. A crash damper according to claim 3, wherein a twist limiter (34a) is provided, for limiting a twisting of the adjustment bolt (19″,19‴) about said central longitudinal axis (7) on a freely chosable circumferential angle (b‴).

12. A crash damper according to claim 3, wherein said internal toothing (25,25′) and said external toothing (24,24′) each extend over cylinder section surfaces (27,26) corresponding to each other, between which flattenings (28), which have approximately the same circumferential angle (b), are formed for the purpose of taking up the internal toothing (25) or the external toothing (24) during the adjustment of the distance (a) of said first and said second securing element (14,18).

13. A crash damper according to claim 1, wherein the adjustment bolt 19,19′,19″,19‴) comprises a support section (20), which is rotatably supported in a tube section (16) connected with one of said first and said second securing element (14) by means of a thread connection between an external thread (21) and an internal thread (22).

14. A crash damper according to claim 10, wherein the external toothing (24,24′,24″,24‴) and the internal toothing (25,25′,25″,25‴) are formed to be thread-like, respectively, and wherein said threads on the one hand and one of said external thread (21) of the support section (20) and said internal thread (22) of the tube section (16) on the other hand each have the same pitch (s) and an identical direction of rotation.

15. A crash damper according to claim 1, wherein rotation of said adjustment device between said first position and said second position is limited to a circumferential angle (c,c′c″)≦90°.

* * * * *